Dec. 3, 1929.  R. K. TENNANT  1,738,404
ICE CUTTING TIRE FOR CAR WHEELS AND SCRAPER THEREFOR

Original Filed June 30, 1927

INVENTOR.
R. K. Tennant
BY
ATTORNEY.

Patented Dec. 3, 1929

1,738,404

UNITED STATES PATENT OFFICE

ROBERT K. TENNANT, OF ALCONA, ONTARIO, CANADA

ICE-CUTTING TIRE FOR CAR WHEELS AND SCRAPER THEREFOR

Application filed June 30, 1927, Serial No. 202,614. Renewed May 2, 1929.

The invention relates to driving wheels of railway section gang motors and hand cars and velocipedes, and the like.

The attachment is designed for use when the condition of the rails of a railway because of ice is such as to prohibit the use of the ordinary flange wheels on section gang motor cars, hand cars, velocipedes, and the like, because the coating of ice prevents traction of the driving wheels on the rails.

The invention has for its object the provision of a tread ring or tire that is adapted to be slipped over the tread of the driving wheel or wheels and secured thereto, said ring or tread being provided with one or more sharpened circumferential ridges to cut through the ice formed on the tread of the rail so as to give the wheel or wheels traction and make it possible to use the section gang motor cars, hand cars, or velocipedes, in winter weather, this being impossible at this time when ice is on the rails because of the slipping of the driving wheels.

A further object of the invention is the provision of a scraper to remove ice from the tread of the wheels comprising a bracket to be secured to the car body and having a scraper member adjustably and pivotally carried by the bracket and provided with a plurality of teeth to engage the tire ring or tread and keep the tire ring or tread free from ice that may adhere thereto.

Figure 1:
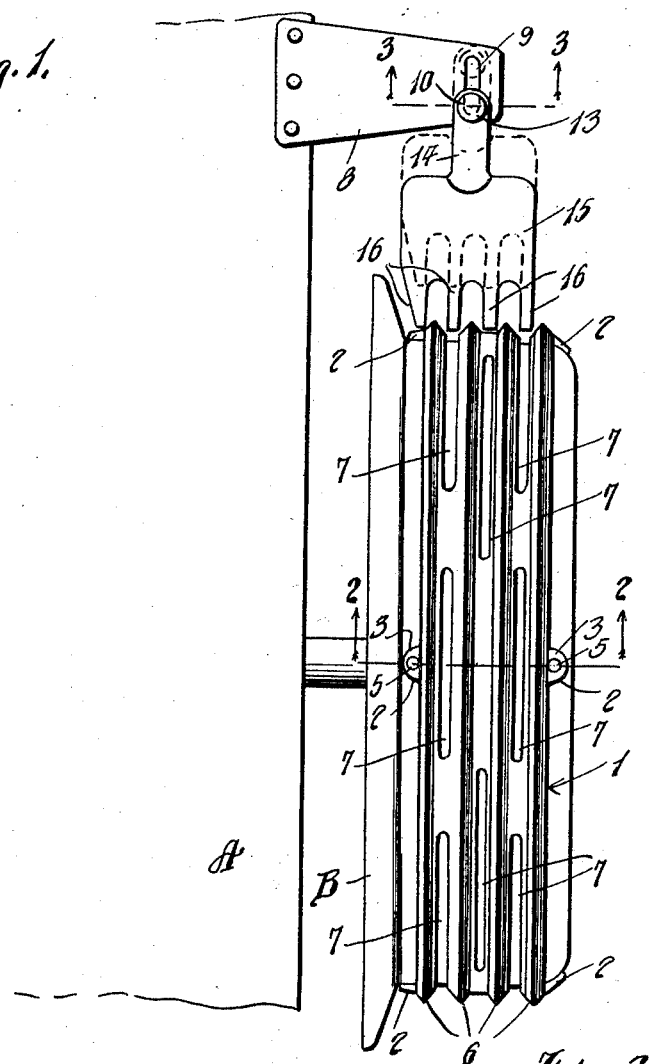
Figure 2:
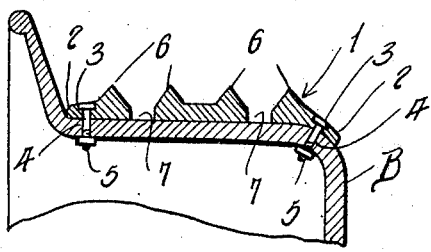
Figure 3:
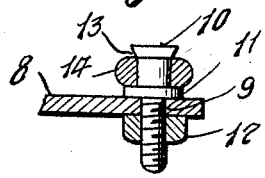

The invention will be described in detail hereinafter and will be found illustrated in the accompanying drawings, in which Figure 1 is a plan view showing a fragment of a car body with the car wheel shown with the attachment applied thereto, and the scraper in position, the scraper being shown in scraping position in full lines and in retracted position in dotted lines, Figure 2 is a detail transverse sectional view on a plane indicated by the line 2—2 of Figure 1, and Figure 3 is a sectional detail on a plane indicated by the line 3—3 of Figure 1.

In the drawings similar reference characters will be used to designate corresponding parts throughout the several views.

In Figure 1 of the drawings a fragment of the platform of a motor or hand car is suggested at A and one of the driving wheels is shown at B, said driving wheel being of the flange type for use on railroad rails.

The attachment for the tread of the wheel B is a ring 1 adapted to be slipped on the tread of the wheel and provided with a plurality of ears 2 extending from the side edges thereof and having openings 3 therein to aline with openings 4 in the tread of the wheel B to receive securing bolts or other fastening means designated 5. The tread of the ring 1 is provided with a plurality of circumferential ridges 6 that are tapered to provide cutting edges as shown and serve to cut through the film of ice that may form on the railroad rails. The body of the ring intermediate of the ridges 6 is slotted at intervals as shown at 7 to reduce the ring 1.

In order to clear the ring 1 of ice that may adhere thereto, a scraper is provided that comprises a bracket 8 that is adapted to be secured to the body A, and having a slot 9 therein in which is secured a bolt 10 having a shoulder 11 to sustain the thrust of the nut 12 to secure the bolt in adjusted positions in the slot 9, and forming with the head 13 a bearing for the arm 14 of the scraper 15 to permit swinging of the scaper 15 relatively to the bracket 8 to follow any side play of the wheel B, 16 indicating teeth forming the scraping edge of the scraper 15 and adapted to engage between the ridges 6 when the scraper is moved into position shown in full lines in Figure 1 to free the tread ring 1 of ice that may adhere thereto and thus add to the efficiency of the tread ring 1 for the purpose hereinbefore stated.

What is claimed is:—

1. A tire for car wheels, comprising a ring adapted to fit the tread of a car wheel, said ring having a plurality of circumferential ridges on its outer side, said ridges being tapered to cutting edges, and means to hold said ring in position on the wheel tread.

2. A tire for car wheels, comprising a ring adapted to fit over the tread of a car wheel, ears extending laterally of said ring, and having openings therein to aline with openings in the tread of a car wheel, fastening members engaging in said openings, and sharpened circumferential ridges on the outer side of said ring.

ROBERT K. TENNANT.